United States Patent [19]

Shum et al.

[11] 4,353,099

[45] Oct. 5, 1982

[54] TAPE-RECORDED SIGNAL RECOVERY METHOD AND APPARATUS

[75] Inventors: Edward K. Shum, San Jose; John J. Peterson, Woodside, both of Calif.

[73] Assignee: Precision Data, Inc., Mountain View, Calif.

[21] Appl. No.: 242,954

[22] Filed: Mar. 12, 1981

[51] Int. Cl.³ .......................... G11B 5/02; G11B 5/04
[52] U.S. Cl. ...................................... 360/27; 360/28; 360/30
[58] Field of Search ...................... 360/27, 28, 30, 32, 360/51

[56] References Cited

U.S. PATENT DOCUMENTS

3,483,540 12/1969 Damron ................................. 360/27
4,054,921 10/1977 Tarami .................................. 360/27

Primary Examiner—Vincent P. Canney
Attorney, Agent, or Firm—Townsend and Townsend

[57] ABSTRACT

A method and apparatus for recovering analog signal information from a multiple-track information storage medium such as a magnetic tape is based upon time base error correction of a frequency modulated carrier signal. In one embodiment, the phase difference of a pair of pilot signals recorded on tracks adjacent a data track is compared by a sampling and pulse counting technique to eventually produce a trigger signal for a phase-locked oscillator. The output of the phase-locked oscillator is employed to sample and measure the period of the input data signal. The period values are written as digital values into a digital first-in first-out buffer memory. A stable clock is used to read out the contents of the buffer memory which are thereafter converted to a pulse rate modulated pulse train. The pulse train is converted to a useable analog signal by a pulse rate to frequency converter. In other embodiments, the phase error between the pilot signals is compared with a stable reference from which a skew error signal is derived to which the phase-locked oscillator is locked. In still other embodiments, a pilot signal is derived from the data track and employed to synchronize the sampling process to the rate of data input.

12 Claims, 5 Drawing Figures

TAPE-RECORDED SIGNAL RECOVERY METHOD AND APPARATUS

BACKGROUND OF THE INVENTION

1. Field of Invention

This invention relates to data recovery from recorded media such as magnetic tape. In particular, the invention relates to time base error correction and synchronization of information recorded in magnetic media.

There is a great need to accurately recover data which has been recorded on a magnetic medium in synchronism with a stable time base. For example, in capstan-driven servo-controlled instrumentation tape recorders which record information by frequency modulating a carrier recorded on a selection of tracks of a multiple-track tape, mechanical variations, such as tape dimension irregularities and capstan speed irregularities, may render it difficult to synchronize the information to a stable time base.

In particular applications, for example, in applications relating to archives of recorded tapes, the data recording system must conform to the constraints of the original recording. For example, certain U.S. Government archive recordings of instrumentation data have a format specification of two reference signals recorded on nonadjacent tracks of a twenty-eight track system. The two reference signal tracks are intended to be used to derive pilot signals for coherent decoding of up to twelve data signal tracks. In systems where two reference signals are employed, a physical skew arises between the reference signal tracks and the data signal tracks due to axial irregularities of the tape and differences in axial alignment between the record tape head of the source recorded and the reproduce tape head of the reproduce recorder. There is therefore a need to correct the skew error in order to coherently recover the desired data signals.

Time base errors also arise because of dynamic differential in speed between recording and reproduction such as wow and flutter.

2. Description of the Prior Art

Time base error correction is known to the art wherein analog signals are directly converted to digital values by conventional analog-to-digital converters, processed digitally and then converted back to analog signals by conventional digital-to-analog converters. Totally digital systems quite often require large amounts of digital memory and sophisticated high-speed processors. It is believed that the best signal-to-noise ratio achievable by known methods, either digital or analog, is between 60 and 70 dB. As a consequence, extremely low level signals, even though recorded, are lost in noise induced by the data recovery system.

It is therefore an object of the present invention to provide data recovery through a system having a signal-to-noise ratio substantially better than the signal-to-noise ratio available by known techniques.

It is also an object of the invention to recover data with a stable and accurately corrected time base.

It is a still further object of the invention to recover data with an accurate and stable time base using two reference signals recorded independently of the data signals on the same medium. These and other objects are accomplished in the invention described as follows.

SUMMARY OF THE INVENTION

A method and system for recovering analog signal information from a multiple-track information storage medium such as a magnetic tape is based upon time base error correction of a frequency modulated carrier signal. In a first preferred embodiment, the phase difference of two reference or pilot signals having been recorded on separate tracks is compared by a sampling technique to produce a signal from which a dynamic skew error correction signal is derived. The correction signal is used to phase lock an oscillator. The output of the phase-locked oscillator is employed as a sample clock to sample an uncorrected data input signal. Sample counts representing periods between zero crossings of the data input signal are written into a digital first-in first-out buffer memory. A stable clock is used to read out the contents of the buffer memory which are thereafter converted to a pulse-rate-modulated pulse train. The pulse train is converted to a useable frequency modulated analog signal by a pulse-rate-to-frequency converter.

In further embodiments, a single pilot signal is selected to generate a clock synchronization signal without dynamic skew error correction. In still further embodiments, a pilot signal may be derived from the data track and employed to synchronize the sampling process to the rate of data input. Means are also provided to regulate the rate of data input.

In particular, the method for recovering the analog signal information from a multiple-track information storage medium such as a tape recorder comprises essentially the steps of comparing the phase relation of reference signals recorded separate from the data signals to generate an error signal, phase locking an oscillator to the error signal at a sampling frequency, sampling the information signal at the sampling frequency as established by the phase-locked oscillator to produce a pulse train, measuring the periods between pulses of the pulse train using as a reference signal the output of the phase-locked oscillator to produce a digital word representing the period length, writing the digital word into a serial memory at the sampling frequency, reading out the word from the serial memory at a stable clock rate which approximates the sampling frequency produced by the phase-locked oscillator, using the word of information to reconstruct a frequency-modulated signal based on the value and read-out rate of the word, and controlling the write-in rate of the words of information into the serial memory to assure a continuous stable output of words at the stable clock rate.

The method may be modified to correct for skew error between references recorded on separate tracks. In particular, the error signal can be compared with a reference signal derived from a stable clock and, assuming a linear skew difference between reference signals, a skew value can be derived which is used to delay or advance the relative relation of the data signal to the reference signals. The oscillator can be phase locked to a weighted average of the reference signals, depending upon physical location of the data track relative to the reference tracks.

In a system where a reference signal is recorded in connection with the data signal, the reference signal can be used directly to phase lock the oscillator.

BRIEF DESCRIPTION OF THE DRAWINGS

The invention will be best understood by reference to the following detailed description taken in connection with the accompanying drawings in which.

DETAILED DESCRIPTION OF SPECIFIC EMBODIMENTS

Figure 1:
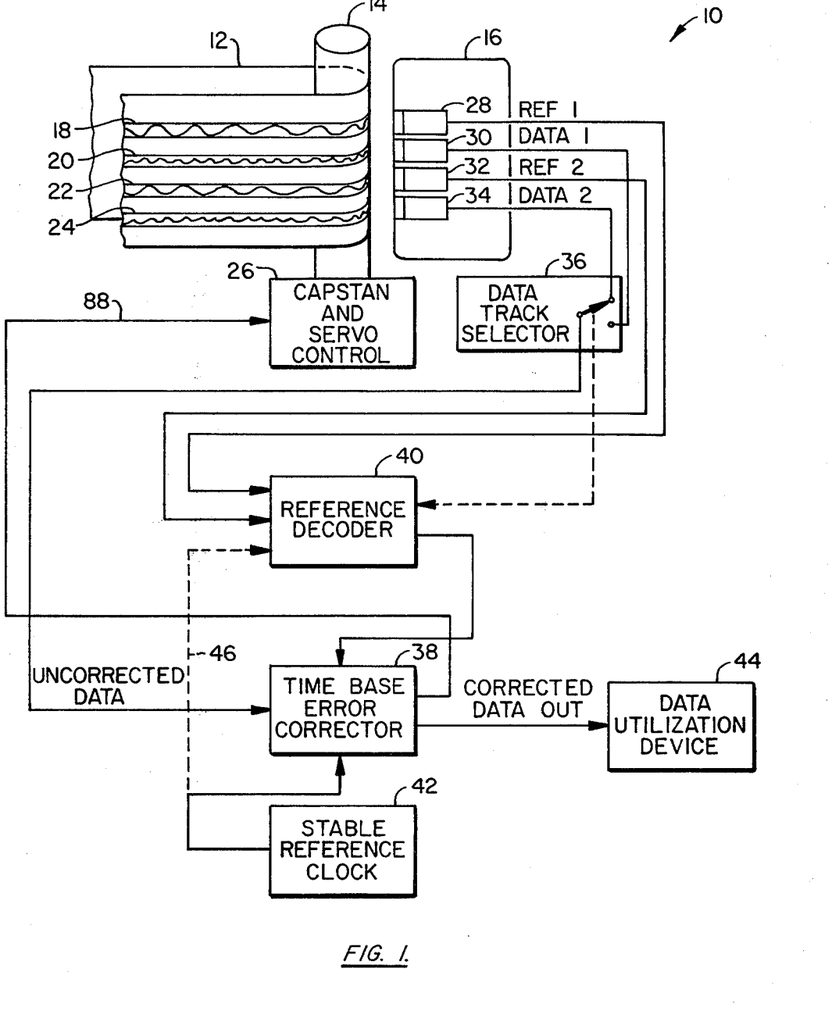
FIG. 1 is a block diagram showing the invention in a tape-recorded data recovery system.

Referring first to FIG. 1, there is shown a tape reproduce system 10 which is operative according to the invention. Information is stored on a magnetic ribbon or tape 12 which is propelled under tension by a capstan 14 past a reproduce head 16. The information is stored in the form of tracks 18, 20, 22 and 24. A typical installation includes twenty-eight tracks of information on a magnetic tape 12. Two types of tracks make up the information. First reference track 18 and second reference track 22 are interleaved with first data track 20 and second data track 24. Normally only two reference tracks are required on a twenty-eight track tape. The capstan is driven under servo control by a capstan motor, which may be depicted as capstan and servo control 26.

The reproduce head 16 comprises a plurality of magnetic pickups, each one aligned with an information track of the tape 12. A first magnetic pickup 28 is disposed in alignment with first reference track 18. A second magnetic pickup 30 is aligned with the first data track 20. A second reference pickup 32 is aligned with second reference track 22. A second data pickup 34 is aligned with second data track 24.

Data track signals reproduced from the tape 12 are fed through a data track selector 36, which is basically a switch to select either the output of the first data track pickup 30 or the second data track pickup 34. The output of the data track selector is uncorrected data which is fed to an input of a time base error corrector 38. The first reference pickup signal and the second reference pickup signal are fed to a reference decoder circuit 40. Information on the status of the data track selector 36 is fed to the reference decoder 40 for presetting any static skew offset as may be required to correct for phase differences between the reference tracks 18 and 22. An output signal from the reference decoder 40 is coupled to the time base error corrector 38. According to the invention, this output signal is a time reference for the uncorrected data. A stable reference clock input signal from a stable reference clock 42 is also fed to the time base error corrector 38. According to the invention, the stable reference clock signal is the time base for corrected data applied to a data utilization device 44. An output signal from the stable reference clock 42 may be supplied through a clock line 46 to the reference decoder 40 for synchronization purposes. The details of the invention will be better understood by reference to the accompanying FIG. 2.

Figure 2:
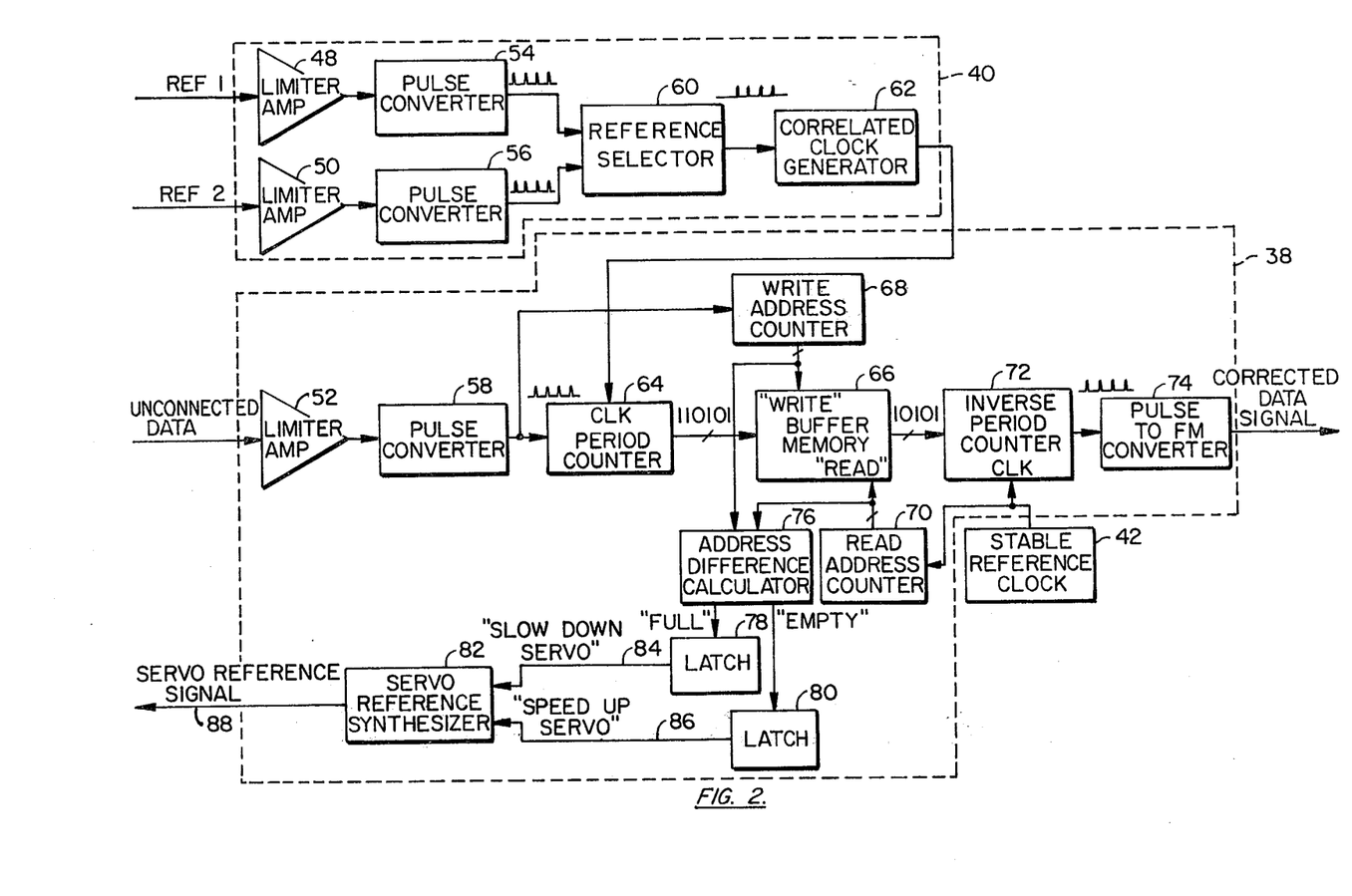
FIG. 2 is a block diagram of a first embodiment without dynamic skew correction of the reference signals.

FIG. 2 illustrates one time base error corrector 38 and reference decoder 40 according to the invention. The reference and data signals are generally carrier-type signals, wherein the information is frequency modulated. Both reference signals are generally pure carrier signals of the same phase and frequency as applied to the original information medium, namely, the tape 12. The signals derived from the reference tracks 18 and 22 are applied respectively to a first limiter amplifier 48 and a second limiter amplifier 50. Similarly, the uncorrected data is applied to a third limiter amplifier 52 in the time base error corrector 38. The limiter amplifiers 48, 50 and 52 are standard circuits used with frequency modulated signals to transform the input signals to constant level-limited square wave signals having duty cycles as close as practicable to fifty percent. The output signals of the limiter amplifiers 48, 50 and 52 are fed through pulse converter circuits 54, 56 and 58, respectively. The purpose of these pulse converter circuits is to convert the zero crossing square wave into pulse trains whose pulse period corresponds to the period between zero crossings. These periods will be relatively constant for the outputs of pulse converters 54 and 56 (they will be slightly modulated by the flutter of the tape transport mechanism), since both are intended to be relatively stable reference signals, but the period will vary according to the modulation information in the case of the output of pulse converter 58.

In the reference decoder 40, the outputs of pulse converters 54 and 56 are fed to a reference selector switch 60. The reference selector 60 is operative to select a pulse train. The pulses of this pulse train may be used to lock up a phase-locked oscillator. The output pulse train is conveyed to what is here termed to be a correlated clock generator 62, which may be a phase-locked oscillator designed to oscillate at a frequency substantially higher than the frequency of the pulse train input thereto. For example, if the input frequency of the reference is approximately 12.5 kHz, the output frequency of the correlated clock generator 62 is approximately 8 MHz. The output of the correlated clock generator 62, according to the invention, is used as a sampling clock for the signal representing the uncorrected data.

The time base error corrector 38 receives the correlated clock signal generator 62 output and the uncorrected data as input signals. As mentioned above, the uncorrected data signal is applied through a limiter amplifier 52, the output of which is a square wave which is applied to a pulse converter 58 which in turn produces a period modulated pulse train. The output of the pulse converter 58 is applied to an input of a period counter 64. The period counter 64 also receives a clock input from the correlated clock generator 62. The function of the period counter 64 is to count the number of clock impulses at the clock input terminal which occur between pulses of the input pulse train from pulse converter 58, thereby generating a digital number for each period between pulses. The output of the period counter 64, a digital word typically eight to twelve parallel bits in length is applied at each waveform transition to a first-in first-out buffer memory 66. A write address counter 68 associated with the buffer memory 66 increments the write address of the buffer memory 66 with each pulse from the pulse converter 58.

The buffer memory 66 is operative to transfer the digitized information word out of a parallel output port when triggered by a read address counter 70. The read address counter 70 is coupled to a read address input of the buffer memory 66. The read address counter 70 operates as a divider. Its synchronizing input is derived from a clock line coupled from the stable reference clock 42.

The stable reference clock 42 is also coupled to a clock input of an inverse period counter 72 to which is also fed the output word of the buffer memory 66. The inverse period counter 72 is operative to convert the digital word into a period modulated pulse train synchronized by the stable reference clock 42. The output of the inverse period counter 72 is coupled to a pulse-to-FM signal converter 74 which reconstructs the data with a corrected time base and applied it to an analog signal output terminal for use by a data utilization device.

The output of the write address counter 68 is also fed to a first input of an address difference calculator 76. Similarly, the output of the read address 70 is also fed to a second input of the address difference calculator 76. The address difference calculator 76 is operative to calculate the difference in address generated by the write address counter 68 and the read address counter 70. The address difference calculator 76 is coupled to two latches, a so-called "full" latch 78 and a so-called "empty" latch 80. The address difference calculator 76 is operative at two predetermined address differences as read from the write address counter 68 and read address counter 70, to apply a state signal to the "full" latch 78 and to the "empty" latch 80. For example, when the difference in addresses is less than a predetermined value, the "full" latch 78 is activated. When the address difference between the write address counter 68 and the read address 70 is greater than a predetermined value, the "empty" latch 80 is activated.

The "full" latch 78 is coupled to a servo reference synthesizer 82 through a "slowdown" line 84. The "empty" latch 80 is coupled to the servo reference synthesizer 82 through a "speedup" servo line 86. The "slowdown" servo line 84 and the "speedup" servo line 86 provide signals, typically binary signals, to the servo reference synthesizer 82 which are employed to increase or decrease the frequency of a servo reference signal on a servo reference signal output line 88. The servo reference synthesizer 82 is typically an oscillator operative off a stable reference whose frequency is variable within a limited range in response to input signals such as a slowdown servo signal or a speedup servo signal as herein described. The servo reference signal line 88 is coupled to the capstan and servo control 26 (FIG. 1) which controls the speed of the capstan 14.

In order to better understand the invention, its operation will now be explained. The invention is a method for recovering an analog information signal in the form of corrected data output from a time base error corrector 38 based on an information signal recorded on an information storage medium subject to time base recovering errors, such as a magnetic tape recording and reproducing system. A principal step in the method is the generation of a clock signal correlated with this information signal. In the example of FIG. 2, the correlated clock signal is derived from either one of the two reference tracks of the magnetic tape 12 and applied through limiter amplifiers 48 and 50, pulse converters 54 and 56 to a reference selector switch 60 which produces a reference signal used to lock up a sampling clock, a phase-locked oscillator or the like in a correlated clock generator 62 which produces the output of a reference decoder 40. The clock signal is correlated with the information signal because it is physically related to the information signal by its relation on the magnetic tape. Any change in the speed of information recovery from the magnetic tape 12, for example, affects both the information signal and the reference signals.

In this method, the signal is typically frequency modulated. Therefore zero crossings of the information signal can be employed as a convenient method for detecting the period. Specifically, the output of the correlated clock generator 62 is used to measure the period of the uncorrected data in the period counter 64 to produce digital values which represent the periods between zero crossings. These digital values are serially stored in a buffer memory 66 and thereafter serially retrieved at a clock rate which is derived from a stable reference clock 42 through the read address counter 70. The digital output from the buffer memory 66 is then reconstructed into its frequency modulated form through an inverse period counter 72 and a pulse-to-FM converter 74. The inverse period counter 72 also derives its reference from the stable reference clock 42.

In this particular embodiment, pulses are used to indicate the occurrence of zero crossings or state transitions in both the correlated clock and the uncorrected data. The decoding process which converts the zero transitions to pulses may also involve synchronization of the pulses to a central clock or stable reference. In this manner, even though the reference may be used to provide its own clock, the entire system can be synchronized to a master clock to assure reliable information recovery.

The buffer memory 66 may take a variety of forms. In a preferred embodiment the buffer memory is a random access memory configured as an 8-bit×1024-word memory such as a pair of 2114 random access memory chips having an address bus coupled to a write address counter and a read address counter. The write address counter includes simple gating means so that the write cycle will not overlap the read cycle. Other buffer memory schemes will be apparent to those of ordinary skill in the art in light of this disclosure.

One of the features of the invention is an ability to control the input rate of a variable time base input signal to assure essentially real time output of a constant rate (stable time base) output signal. According to the invention, this feature is embodied in control of the rate of data recovery through feedback regulation of the speed of the capstan and thereby the rate at which data are stored in the buffer memory 66. It is important that the buffer memory be neither too full nor too empty of the input data in order to assure a constant output rate of the data. This rate can be controlled in a preferred embodiment within the limits of a memory size having a 1024-word capacity and a cycle time of about 4 MHz by controlling the rate of input relative to the output rate within a ±b 0.3%.

Figure 3:
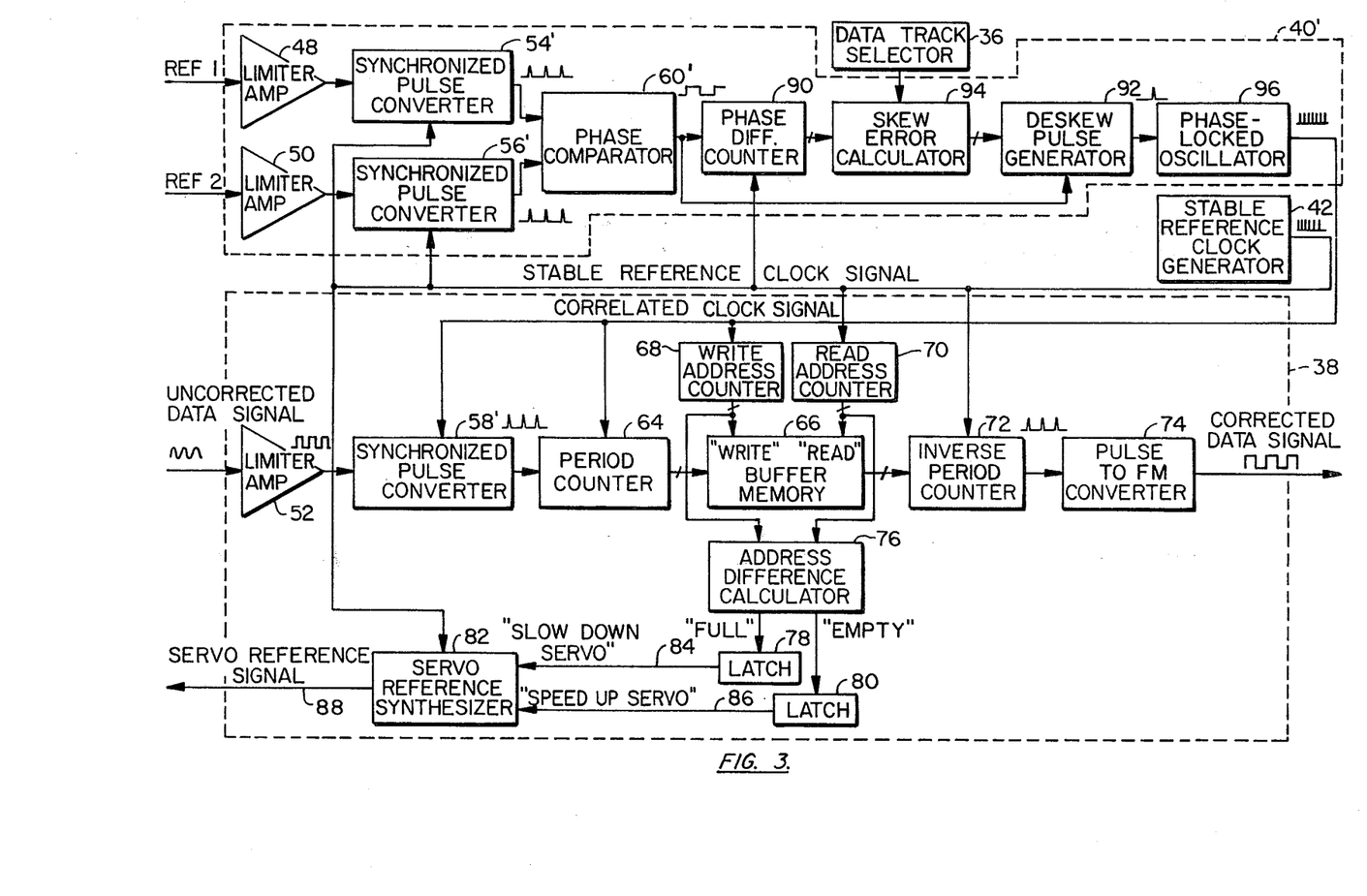
FIG. 3 is a block diagram of a second embodiment showing a system with dynamic skew correction of the reference signals.

Turning now to FIG. 3 there is shown a second embodiment of the invention in which a system for dynamic skew correction is included. In this embodiment, all elements having substantially the same function as elements in the embodiment of FIG. 2 are assigned the same numerals. The system of FIG. 3 includes a time base error corrector 38, a reference decoder 40' and stable reference clock generator 42. In addition, there is a data track selector 36. The reference decoder 40' is a dynamic skew corrector according to the invention as hereinafter explained. Its output is a correlated clock signal, i.e., a clock signal derived from a pair of reference input signals and corrected for skew error between the reference input signals.

The time base error corrector 38 comprises a limit amplifier 52 coupled to a synchronized pulse converter 58' which is synchronized by the correlated clock signal, a period counter 64, a buffer memory 66, an inverse period counter 72, and a pulse-to-FM converter 74 all in the information path. A write address counter 68 and a read address counter 70 are coupled to the address ports of the buffer memory 66 and also to dual inputs of an address difference calculator 76. The output of the address difference calculator 76 is a pair of lines coupled respectively to a "full" latch 78 and an "empty" latch 80, the outputs of which are respectively a "slowdown" servo line 84 and a "speedup" servo line 86 to a servo reference synthesizer 82. The stable reference clock 42 is coupled to the read address counter 70, the inverse period counter 72 and the servo reference synthesizer 82 of the time base error corrector 38.

The reference decoder, hereinafter the skew error corrector 40', comprises first and second limiter amplifiers 48 and 50, first and second pulse converters 54' and 56', a phase comparator 60', the output of which is coupled first to a phase difference counter 90 and also to a deskew pulse generator 92. The phase difference counter 90 is operative to generate a parallel digital word which is coupled to a skew error calculator 94 which is also coupled to data track selector 36. The output of the skew error calculator 94 is a parallel digital word coupled to the deskew pulse generator 92. The deskew pulse generator 92 is coupled to a phase-locked oscillator 96, the output of which is the correlated clock signal.

The stable reference clock generator 42 is coupled to the synchronized pulse converter 54' and 56' and to the phase difference counter 90 of the skew error corrector 40'. The clock generator 42 output signals are used to gate the uncorrected data to a synchronized time base to assure proper data framing.

The function of the skew error corrector 40' is to compare the two reference signals and to generate a new signal whose phase is a dynamically-weighted average of the two original signals. The weighting is dependent on which data channel is being corrected for time base error. The manifestation of tape skew is a variation of phase between two signals from different tracks one with respect to the other. A fixed delay of one signal with respect to another is termed static skew. A variable delay of one signal with respect to another is termed dynamic skew. Static skew is normally caused by misalignment of the record and reproduce heads with the tape guides such that the direction of travel if off an axis perpendicular to tape travel. Dynamic skew results because of variations in the tape and other mechanical factors in the path of the tape motion. Although static skew is generally small and has little effect on relative timing of tape signals, dynamic skew between several channels and any data channel may result in an error when a single track separate from the data track is used as the sole reference source for the generation of a sampling frequency. The reference source is weighted so as to produce a minimum dynamic phase error with respect to the data track selected.

The phase comparator 60' compares the phase of the reference signals as converted to pulses by the synchronized pulse converters 54' and 56' to generate a new signal whose pulse width is the phase difference of the two reference signals. This pulse width signal is converted to a binary number by the phase difference counter 90. A second signal may be generated by the phase comparator 60' to indicate polarity of the two reference signal phases with respect to each other. Skew error correctors 40' can be used with a simultaneous multiple-channel reproduction system. The circuitry up to the phase comparator 60' is common to all channels. The remainder of the circuitry is duplicated for each channel of data, since each channel of data is positional with respect to the same reference channels. Thus the deskew data is unique to each channel. The difference in skew between the channels is assumed to be linear; thus positive skew and negative skew can be computed with respect to position relative to the reference channels.

The general equation that must be satisfied to result in the proper phase shift is expressed in two parts, one for positive skew and one for negative skew. The positive skew equation is:

$$S_{X+} = D(C-SL)/(SH-SL)$$

Where
$S_{X+}$ = Phase shift in seconds
D = Phase difference in seconds of the two servo reference channels
C = Channel # of data channel
$S_L$ = Channel # of first reference channel
$S_H$ = Channel # of second reference channel
The negative skew equation is:

$$S_{X-} = D(SH-C)/(SH-SL)$$

The expressions C−SL and SH−C are to be expressed as absolute positive numbers. For 28-channel wideband recorders with reference channels contained on tracks 8 and 24, the expressions become:

$$S_{X+} = D(C-8)/16 \text{ and } S_{X-} = D(24-C)/16$$

or $$S_{X+} = (DN+)/8 \text{ and } S_{X-} = (DN-)/8$$

Where $$N+ = (C-8)/2 \text{ and } N- = (24-C)/2$$

Figure 5:
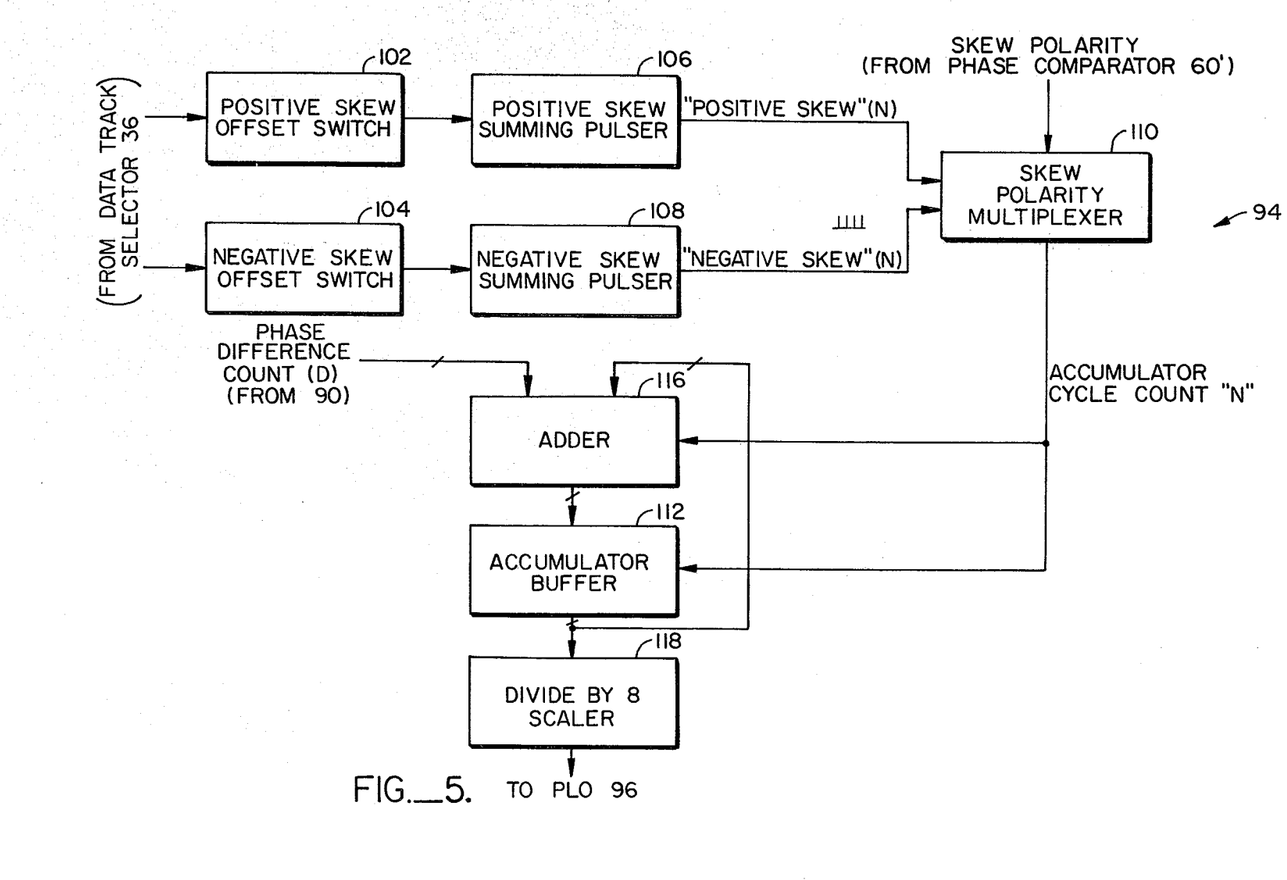
FIG. 5 is a block diagram of a skew error calculator according to the invention.

Referring to FIG. 5, which shows one embodiment of a skew error calculator 94, positive and negative offset data must be specified for each channel in the equations given above. This may be done by means of a preselectable positive skew offset switch 102 and a negative skew offset switch 104 of the skew error calculator 94. An input from the data track selector 36 (FIG. 3), for example, may indicate which track is selected for reference. The skew error calculator 94 may then perform arithmetic operations of the form ND/8 where D is the phase difference, N is the skew offset and 8 is a scaling factor. The multiplication N×D may be performed by accumulating a sum with D for N number of times.

A positive skew summing pulse 106 is operative to receive an output value from the positive skew offset switch 102 and to convert it into a positive skew pulse train of count N each time an accumulation is initialized. The number N is preselected by the setting of switches 102 and 104 as established by the data track selector 36.

A skew polarity multiplexer 110 is operative to select between the two series of pulses N based on the indication of skew polarity from the phase comparator 60'.

The deskew pulse generator 94 further includes an accumulator/buffer 112 and an adder 116 both of which receive an accumulator cycle count N from the multiplexer 110 at clock inputs. The output of the phase difference counter 90 (FIG. 3) is loaded as a digital number into the adder 116 with each clock cycle. The output of the accumulator/buffer 112 is also loaded as a digital number into the adder 116 to be added to the phase difference count D. The output of the adder 116 is then provided to the digital preselect inputs of the accumulator/buffer 112 with each clock of the accumulator cycle count N. The output of the accumulator/buffer 112 is consequently the digital number $N \times D$.

The accumulator/buffer is therefore a means to convert the phase difference signal which occurs as a variable pulse width two-state signal into a digital number whose value is a measure of the period between state transitions. The value $N \times D$ may thereafter be scaled (e.g., by right shifting or dividing by a power of 2) and applied to the deskew pulse generator 92.

The deskew pulse generator 92 is a device operative to convert the value $N \times D/8$ into a pulse train in synchronism with the phase comparator 60' output. The generator 92 may be an adder which is operative to be preloaded with the output of the calculator 94, clocked by the output of the phase comparator 60' and to generate a synchronization pulse at each carry. The pulse is used to synchronize a phase locking oscillator whose output is the high frequency sampling clock.

The phase-locked oscillator 96 is a phase-locked loop frequency multiplier. The input or reference source may have a frequency of about 12.5 kHz to about 50 kHz. The reference source may feed back signals within the phase-locked oscillator 96 which are compared in an internal phase comparator (not shown) to develop an error voltage which is utilized to change the frequency of the output of an internal voltage controlled oscillator (not shown). The output of the voltage controlled oscillator may then be fed to an internal frequency divider (not shown) which drives a clock having a sampling clock rate of between 4 MHz and 8 MHz. The output of the internal sampling clock generator is used for synchronizing and sampling the uncorrected data signal in the time based error corrector. However, a separate stable reference clock generator 42 is used for reconstructing the data on a corrected and stable time base at the output of the time base error corrector 38.

Figure 4:
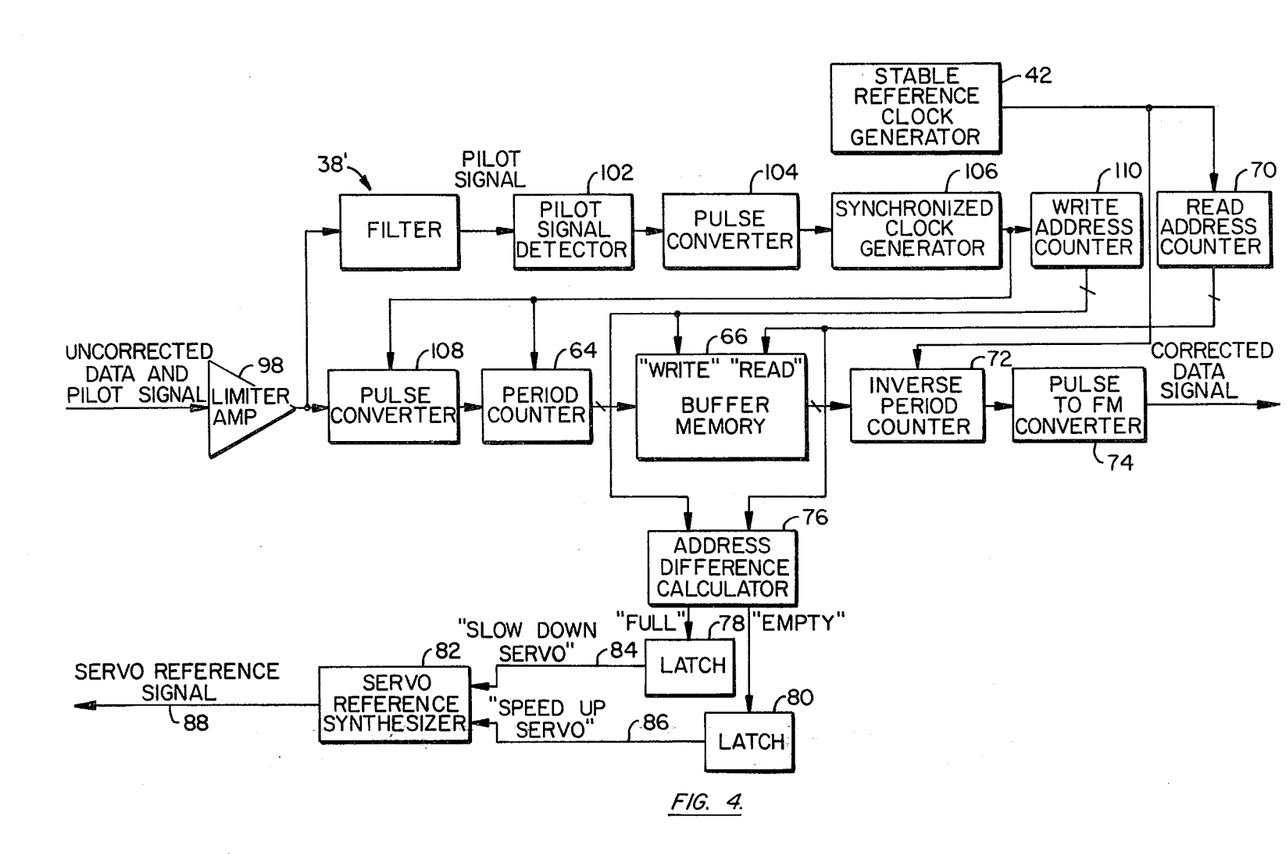
FIG. 4 is a block diagram of a third embodiment in which reference signal is derived from the data track.

Two embodiments have been described in which the reference signal is derived from a separate reference track. A third embodiment is also suggested according to the invention in which uncorrected data and a pilot signal are recorded on the same track. Turning to FIG. 4, there is shown such a time base error corrector 38'. In this system there is no dynamic skew correction. Uncorrected data and a pilot signal, generally at a different frequency than the uncorrected data, are applied at the input of a limiter amplifier 98. The output of the limiter amplifier 98, which is the limited FM signal, is fed through a time domain filter 100 to attenuate the uncorrected data signal and to pass the pilot signal. The pilot signal is conveyed to a pilot signal detector 102, which is typically a phase-locked loop oscillator, to extract any information signal from an underlying carrier. The output of the pilot signal detector 102 is provided to a pulse converter 104 which generates a pulse train used for locking up a synchronized clock generator 106. The synchronized clock generator 106 may be a phase-locked oscillator as explained hereinabove, the output of which is a relatively high frequency pulse train which is used as a sampling clock correlated with the input signal. The limit amplifier 98 also drives a pulse converter 108 synchronized to the clock generator 106 output, the pulse converter 108 driving a period counter 64, and thence buffer memory 66, thereafter the buffer memory 66 applying its digital word output to an inverse period counter 72, which is coupled to drive a pulse-to-FM converter 74. The synchronized clock generator 106 drives a write address counter 110 which in turn is coupled to the address bus of the buffer memory 66 and one input of an address difference calculator 76. A stable reference clock generator 42 drives a read address counter 70 and also is a sampling clock for the inverse period counter 72. The read address counter 70 is coupled to the address bus of buffer memory 66 and also to the second input of the address difference calculator 76. The address difference calculator drives "full" latch 78 and "empty" latch 80, which in turn supply control signals to a servo reference synthesizer 82, as hereinabove explained.

In this embodiment of the invention, a pilot signal is derived from the same track of information as uncorrected data used to generate a sampling clock to sample the input frequency modulated signal which in turn drives a period counter supplying a digital word to a buffer memory in synchronism with the derived clock signal. A stable reference clock signal is used to reconstruct the digital data through inverse period counting and a pulse-to-frequency-modulated signal converter which produces as an output the desired time base corrected data signal.

The invention has now been explained with reference to specific embodiments with sufficient detail to enable one of ordinary skill in the art to construct apparatus and to perform methods according to the invention. Other embodiments will be suggested to those of ordinary skill in the art. It is therefore not intended that this invention be limited except as indicated by the appended claims.

What is claimed is:

1. A method for recovering a frequency modulated analog information signal recorded on an information storage medium subject to time base recovery errors, said method comprising the steps of:

generating a clock signal correlated with said information signal;

measuring periods between zero crossings of said information signal with a clock whose rate is based on said correlated clock signal to produce accurate values representative of said periods between zero crossings;

serially storing said values;

thereafter serially retrieving said stored values at a clock rate based on a stable reference clock; and reconstructing said information signal from said retrived values by modulating the period between zero crossings of a carrier signal which is derived from a stable reference clock.

2. The method according to claim 1 wherein said generating step further includes the step of sampling a first reference signal reproduced from said information storage medium to produce a first signal train of state transitions for use in generating said correlated clock signal.

3. The method according to claim 2 wherein said generating step further includes the steps of:

sampling a second reference signal reproduced from said information storage medium to produce a second signal train of state transitions; and comparing the transition rate of said first train with the transition rate of said second train to produce a third signal train of state transitions for use in generating said correlated clock signal.

4. The method according to claim 3 wherein said first reference signal is reproduced from a first track of said information storage medium, said second reference signal is reproduced from a second track of said information storage medium physically separated from said first track and said information signal is reproduced from a third track of said information storage medium physically separated from said first track and from said second track, and wherein said generating step further includes the steps of:

measuring periods between state transitions of said third signal train with a clock of whose rate is based on a stable reference clock signal to produce accurate values representative of a skew difference between said first track and said second track;

weighting said skew difference values with a value representative of the location of said third track relative to said first track and said second track to produce a skew compensation value; and converting said skew compensation value to a fourth signal train of state transitions for use in generating said correlated clock signal.

5. The method according to claim 4 wherein said generating step further includes the step of applying said fourth signal train to a phase-locked oscillator, said phase-locked oscillator being operative to generate a fifth signal train of state transitions representative of said correlated clock signal.

6. The method according to claim 1 wherein said periods measuring step comprises generating a pulse at each positive and negative transition of said information signal;

counting the number of transitions of said correlated clock signal between said pulses thereby to produce a digital period value.

7. The method according to claim 6 wherein said storing step comprises writing said digital period value into a digital buffer memory in successive memory locations; and incrementing a write address counter at the end of each write cycle period.

8. The method according to claim 7 wherein said retrieving step comprises reading said stored values from said buffer memory through a memory input/output register.

9. The method according to claim 8 wherein said reconstructing step comprises converting values representing a digital carrier period count into a square wave signal having modulated periods between state transitions.

10. The method according to claim 8 further including the step of controlling the rate of said value storing step between selected upper and lower limits sufficient to assure continuous stable output of said stored values during said retrieving step.

11. The method according to claim 10 wherein said controlling step comprises comparing write addresses to read addresses of said buffer memory to generate a difference value; and applying said difference value to a servo reference signal to modulate the rate of reproduction of said analog signal information from said information storage medium.

12. An apparatus for recovering a frequency modulated analog information signal recorded on an information storage medium subject to time base recovery errors, said apparatus comprising:

means for generating a clock signal from a reference signal reproduced from said storage medium, said reference signal being correlated to said information signal;

means for measuring periods between zero crossings of said information signal by reference to a clock rate referenced to said correlated reference signal, said measuring means being operative to produce values representative of said period;

means for serially storing said values;

means for serially retrieving said stored values at a clock rate based on a stable reference clock; and means for reconstructing said information signal from said retrieved values, said reconstructing means being operative to modulate the period between zero crossings of a carrier derived from a stable reference clock.

* * * * *